United States Patent Office 2,947,636
Patented Aug. 2, 1960

2,947,636

PRODUCTION OF PROTEINACEOUS DRY SYRUP COMPOSITION AND THE RESULTING PRODUCT

Louis Sair, Evergreen Park, Ill., assignor to The Griffith Laboratories, Inc., Chicago, Ill., a corporation of Illinois No Drawing. Filed Oct. 29, 1958, Ser. No. 770,270

6 Claims. (Cl. 99—142)

The present invention relates to an edible composition for use in foodstuffs, and in particular, for use as an additive in preparing comminuted meats.

In the U.S. Patent No. 2,634,212, to Komarik, there is described a meat-conditioner for comminuted meats functioning as emulsifier for fat and as a water-binding agent. The active ingredient is a dehydrated incomplete hydrolysate of starch having a dextrose-equivalent (D.E.) in the range from 24 to 55. The D.E. number is the percentage of the total solids by weight which is reducing sugar.

Commercial corn syrup is an hydrolysate composition that may be dried to a powder known as "dry-syrup." As the D.E. of an hydrolysate increases to 55 the fluidity of the liquid syrup and the hygroscopicity of the "dry-syrup" increase to the detriment of water-binding power. Above D.E. of 55 the sweetness increases to a point making it objectionable in the quantities needed for use as a meat-conditioner. When the D.E. is below 24, the hydrolysate reacts with iodine more like a cereal or starch giving a dark stain, and making it objectionable in certain fields and especially as a meat-conditioner. It functions more like a starch because of the greater molecular sizes of the ingredients. According to said patent, dry-syrup having a D.E. in the range from 24 to 55 is used for meat products, but preferably one having a D.E. in the range from 30 to 42, in order to avoid border-line compositions with greater certainty.

According to said patent, the hygroscopic nature of the dry-syrup is such that on standing it takes on moisture and cakes, to the detriment of its use in commerce as a packed or packaged material for shipment and storage. Other materials, according to the patent, are mechanically incorporated with it to overcome the effects of such hygroscopicity, but such added materials are those which in general limit the utility to meat products.

The present invention aims to produce a non-hygroscopic additive for foods in general, containing dry-syrup of the kind which per se is hygroscopic or subject to caking.

A particular object of the invention is to dry a liquid composition containing liquid hydrolysate syrup and protein to form a non-hygroscopic dry solid composition.

Another object of the invention is to increase the nutritive value and the emulsifying value of a composition comprising dry-syrup solids.

Various other and ancillary objects and advantages will appear hereinafter.

The present application is a continuation-in-part of my prior applications Serial Nos. 587,486 and 587,500, both filed May 28, 1956, and both now abandoned.

The invention is carried out by forming a homogeneous aqueous liquid composition in which an hydrolysate of starch having a D.E. in the range from 24 to 55 is dissolved, and in which is dissolved or dispersed an edible protein. The protein may be gelatin, casein, glycinin or other soy protein, albumen, lactalbumen, hemoglobin, cotton-seed protein, peanut protein and others. The reference to "protein" herein and for the purposes of the present invention contemplates forms thereof at any pH which permits the protein to be dissolved or colloidally dispersed in the solution of the hydrolysate.

For example, commercial glycinin as derived from soy material has a pH near its isoelectric point of around 4.6 and is water-insoluble. But, at pH values upwardly from 6 it is soluble, and for the present invention should be so used. Likewise, the acid-washed soy protein of my copending application Serial No. 587,500, is insoluble at the isoelectric pH at which it is recovered, but soluble at pH values upwardly from 6. Special forms of said glycinin and said acid-washed soy may be effected by heating in water at elevated temperatures and at pH values upwardly from 6 to form viscous translucent solutions which are excellent for the present invention.

Gelatin is a protein which may be used without control of its pH. Albumen is used in solution below the coagulation temperature. Casein is used as its soluble sodium caseinate.

With respect to use in meats, the described dry-syrup solids are customarily used in an amount in the range from 1 to 13 lbs. per 100 lbs. of meat. Soy protein, for example, is customarily used in an amount in the range from 0.5 to 4 lbs. per 100 lbs. of meat.

The invention is carried out by suitably drying a homogeneous aqueous liquid containing as the principal solids a mixture of dissolved dry-syrup solids and dissolved or dispersed protein solids in which each component may vary from 5% to 95% by weight. Proteins are non-hygroscopic and by the processing of the present invention the dried protein provides a protective agent for the dry-syrup solids, such that the co-dried duplex composition is non-hygroscopic.

The hydrolysate and the protein are the essential ingredients and the predominating solids content. Incidental material may be present, such as may be derived from processing starch to the hydrolysate, and such as may result from processing to produce the protein. For example, sodium chloride may be present as a result of neutralizing the hydrochloric acid which hydrolyses the starch. When the protein is casein or glycinin it may be present as the caseinate or glycininate of sodium or potassium or ammonium. When the protein is acid-washed soy material such as described in my said copending application Serial No. 587,500, by water-washing at a pH in the vicinity of the isoelectric range of 4.0 to 4.8, the product as a proteinate will contain non-protein soy content insoluble at said pH of washing, such as fiber. The following table gives the analyses of acid-washed protein product herein designated Form A as prepared from defatted soy flakes, and of a solubilized sodium proteinate composition herein designated Form B, effected by adding pH-elevating agent.

| | Form A | Form B |
|---|---|---|
| | Percent | Percent |
| Moisture | 4.4 | 3.3 |
| Ash | 2.0 | 5.7 |
| Protein | 70.0 | 68.0 |
| | pH=4.4 | pH=7.1 |

In calculating the 5% to 95% of protein or of dry-syrup for the liquid to be dried, the actual contents of such are considered, and incidental accompanying ingredients are surplus over the 100 parts consisting of dry-syrup plus protein. The resulting wide range of non-hygroscopic dry compositions is adequate for selecting ones for comminuted meats to supply an amount of each component which is within the customary ranges of usage above given. For example, a composition containing 80% of protein used in amount of 5 parts per 100 parts of meat will supply 1 part of dry-syrup solids and 4 parts of protein, these being, respectively, the minimum and maximum of the customary ranges. The said customary ranges for use in meat products are not to be considered as limiting the character of the composition, nor is the utility of the compositions limited to use in meat products.

The choice of method of drying in some instances will depend upon the protein present. Roll-drying and oven-drying expose the protein to higher temperatures for moderately long periods. Spray-drying is much quicker. In the case of protein which is capable of coagulation, or denaturing, such as albumen, spray-drying is carried out when it is desired not to denature the protein.

*Example 1*

| | Lbs. |
|---|---|
| Water (60 gallons) | 500 |
| Dry albumen | 25 |
| Dry-syrup solid (D.E.=42) | 500 |

Dissolve the albumen in the water and blend in the remainder and spray-dry. The albumen does not coagulate.

*Example 2*

| | Lbs. |
|---|---|
| Corn syrup (D.E.=42) (80% solids) | 600 |
| Gelatin | 30 |
| Water (12 gallons) | 100 |

Dissolve the gelatin in hot water (190° F. to 210° F.) then add the syrup. The solution is dried in any desired manner.

*Example 3*

| | Lbs. |
|---|---|
| Water (100 gallons) | 835 |
| Sodium Proteinate | 80 |
| Corn-syrup solids (D.E.=42) | 400 |

The sodium proteinate is Form B above described, used as a dry powder. When used before it is a dry powder and directly from its processing from defatted soybean meal, the amount of water accompanying it is deducted from the formula water above. The liquid is then dried. When spray-dried, the product is characterized by free flowing qualities showing no tendency to cake.

*Example 4*

| | Lbs. |
|---|---|
| Water (100 gallons) | 835 |
| Casein (adjusted to pH of 7.0 with NaOH) | 160 |
| Corn syrup (D.E.=42) (80% solids) | 12.5 |

The casein is dissolved in water, and then the corn syrup is mixed into the casein solution. The liquid is spray-dried.

In the foregoing examples, it is to be understood that the corn-syrup and the dry-syrup solids are interchangeable ingredients, by considering the 20% or other content of water in the syrup as a part of the formula water.

In the foregoing examples, the relative contents of protein and of dry-syrup solids are as follows:

| Example | Dry-Syrup Solids | | Protein | |
|---|---|---|---|---|
| | Parts | Percent | Parts | Percent |
| 1 | 500 | 95.23 | 25 | 4.77 |
| 2 | 480 | 94.1 | 30 | 5.9 |
| 3 | 400 | 83.4 | 80 | 16.6 |
| 4 | 10 | 5.9 | 160 | 94.1 |

The invention is not limited to or by the examples above given, and it is to be understood that many other compositions and combinations are contemplated as falling within the scope of the invention as set forth in the appended claims.

I claim:

1. A dry solid composition useful in the preparation of food products comprising residue of drying water from an homogeneous aqueous composition comprising 100 parts by weight of solids consisting of from 5 to 95 parts by weight of dissolved hydrolysate of starch having a dextrose equivalent in the range from 24 to 55, and the remainder proteinaceous material dispersed in the solution of hydrolysate, said proteinaceous material being selected from the group consisting of water-soluble and water-dispersible proteins and alkali proteinates.

2. A dry solid composition comprising the product of drying a homogeneous aqueous composition comprising 100 parts by weight of solids consisting of from 5 to 95 parts by weight of dissolved hydrolysate of starch having a dextrose equivalent in the range from 24 to 55, and the remainder proteinaceous material dispersed in the solution of hydrolysate, said proteinaceous material being selected from the group consisting of water-soluble and water-dispersible proteins and alkali proteinates.

3. A composition according to claim 1 in which the hydrolysate of starch has a dextrose equivalent of about 42.

4. The method of forming a dry non-hygroscopic composition which consists of dispersing from 5 to 95 parts by weight of proteinaceous material in an aqueous solution containing an hydrolysate of starch having a dextrose equivalent in the range from 24 to 55, said proteinaceous material being selected from the group consisting of water-soluble and water-dispersible proteins and alkali proteinates, the amounts of said proteinaceous material and said hydrolysate totaling 100 parts, and drying the resulting aqueous dispersion.

5. The method of claim 4 in which the dispersion is spray-dried.

6. The method of claim 4 in which the hydrolysate of starch has a dextrose equivalent of about 42.

References Cited in the file of this patent

UNITED STATES PATENTS

| 1,450,836 | Bosworth | Apr. 3, 1923 |
| 2,251,334 | Hall | Aug. 5, 1941 |
| 2,634,211 | Komarik | Apr. 7, 1953 |
| 2,803,548 | Hagerty | Aug. 20, 1957 |